United States Patent [19]

Stayner et al.

[11] 4,113,526
[45] Sep. 12, 1978

[54] WAX FLUX COMPOSITIONS

[75] Inventors: Robert A. Stayner, Lafayette; Richard C. Fox, San Rafael; Thornton K. Jones, Greenbrae, all of Calif.

[73] Assignee: Chevron Research Company, San Francisco, Calif.

[21] Appl. No.: 811,505

[22] Filed: Jun. 30, 1977

[51] Int. Cl.² ............................................. B23K 35/34
[52] U.S. Cl. ........................................ 148/23; 148/22
[58] Field of Search ..................................... 148/22–26

[56] References Cited

U.S. PATENT DOCUMENTS

| | | | |
|---|---|---|---|
| 3,960,614 | 6/1976 | Stayner | 148/23 |
| 3,977,916 | 8/1976 | Stayner | 148/23 |
| 3,985,587 | 10/1976 | Choby | 148/23 |
| 4,028,143 | 6/1977 | Stayner | 148/23 |

Primary Examiner—P. D. Rosenberg
Attorney, Agent, or Firm—D. A. Newell; C. J. Tonkin; J. J. DeYoung

[57] ABSTRACT

Wax-flux compositions for use in soldering processes comprising: (a) a major amount of a wax; and (b) an effective amount to cause fluxing, at or below the temperature of the piece to be soldered, of a wax-soluble, phosphorus-containing acid.

10 Claims, No Drawings

WAX FLUX COMPOSITIONS

BACKGROUND OF THE INVENTION

The invention relates to soldering and fluxes used in soldering processes. More particularly, the invention relates to wax soldering fluxes useful in high-temperature soldering processes.

Soldering is one of the oldest methods of joining two or more metal articles. Soldering involves the joining of metallic surfaces by flowing between them by capillary attraction alloys of lower melting point than the metals to be joined. The metal surfaces remain unmelted, but are solidly united when the solder alloy or solder metal solidifies.

Preparation of the joint surfaces is an important factor in soldering. With few exceptions, a flux composition is utilized. Fluxes are used to prevent the oxidation of the filler metal and of the surfaces of the metal being joined during the heating. The flux will also dissolve oxides which naturally exist on most metal surfaces as well as those that may form during the heating operation. Additionally, fluxes influence the surface-tension equilibrium in the direction of solder spreading.

Fluxes are applied to the metal surfaces to be soldered by many methods, for example brushing, spraying, dipping, etc. However, utilization of a liquid vehicle for application of the flux has many disadvantages in many processes. For example, in the assembly of automotive radiators, the parts to be soldered are commonly dipped in a flux-containing bath. Dipping of the part has many disadvantages. First, it results in a large waste of material, since the entire part is coated with fluxing material rather than just the surface to be soldered; secondly, the solvent must be evaporated first before the soldering occurs, and this results in a loss of energy; thirdly, use of a solvent-or water-based flux creates air pollution problems due to emissions of volatile constituents into the atmosphere.

The aforementioned problems can be overcome through utilization of a wax flux. Wax-flux compositions are known in the art and have been used in low-temperature soldering processes. See, for example, U.S. Pat. Nos. 3,977,916; 3,960,614; 3,960,613; 3,975,216; and 3,954,494, which discloses wax-flux compositions containing sulfonic acids. Wax-flux compositions avoid some of the prior art problems encountered with liquid fluxes in that the flux can be readily applied only to the surface to be soldered, thus avoiding waste of flux. Furthermore, the wax quickly solidifies so that the parts can be easily stored for future soldering. However, wax-flux compositions have not been utilized in higher-temperature soldering for many reasons, but particularly because of the autoignition hazards caused by the wax component of the flux.

SUMMARY OF THE INVENTION

A wax-flux composition is disclosed which comprises:

(a) a major amount of a wax having a melting point between 40° and 100° C; and (b) an amount effective to cause fluxing at or below the soldering temperature of the piece to be soldered of a wax-soluble phosphorus-containing acid of the formula

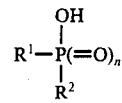

wherein $R^1$ and $R^2$ are hydrogen, hydroxyl, hydrocarbyl or hydrocarbyloxy and wherein the total number of carbon atoms contained in said $R^1$ and $R^2$ groups is from 8 to 30 carbon atoms, and n is 0 or 1.

The wax-flux composition of the present invention increases the autoignition temperature of the wax-flux composition, allowing use of a wax flux in soldering processes where the wax would normally present a fire hazard.

DETAILED DESCRIPTION OF THE INVENTION

Wax flux compositions for use in soldering processes, particularly high-temperature soldering processes, are provided comprising: (a) a major amount of a wax having a melting point between 40° and 100° C; and (b) an amount effective to cause fluxing at or below the soldering temperature of the piece to be soldered of wax-soluble, phosphorus-containing acids, such as phosphoric acid esters, phosphonic acid, phosphonic acid esters, phosphorous acid esters or phosphinous acid.

The Wax

Suitable waxes for use in the wax-flux compositions of this invention include any wax or wax blend which is solid at room temperature and has a melting point below the temperature at which the soldering process will be conducted. Preferably the waxes have a melting point of at least 40° C and generally the waxes will have a melting point not greater than 100° C. Preferably the waxes have a melting point between 50° and 80° C. Melting points as used herein are determined by ASTM D87-66.

Suitable waxes include petroleum-derived waxes such as the well-known paraffin waxes, microcrystalline waxes, slack waxes, scale waxes, petrolatum, etc. These waxes are obtained from the processing of crude petroleum and are generally substantially saturated, substantially straight long-chain aliphatic hydrocarbons. Petroleum waxes suitable for use in this invention have melting points within the range specified above. Suitable wax blends for use in this invention include the hot-melt coatings which consist of blends of petroleum waxes and polymers. copolymers or resins. Suitable materials which may be blended with the petroleum waxes include polymers of low-molecular-weight olefins, such as polymers of ethylene, propylene, butylene, isobutylene, and the like. Suitable polymers will have molecular weights from about 1000 to about 1,000,000, more usually from about 1000 to about 50,000. These are average molecular weights, and generally a major portion of the molecules of the polymer will have molecular weights close to the average.

Suitable copolymers include copolymers of olefins. Suitable copolymers include copolymers of propene and butene. Typically such a copolymer will contain from about 15 to about 85 mol percent propene, more usually from about 25 to 75 mol percent propene. Typical copolymer molecular weights will range from about 1000 to about 1,000,000, more usually from about 1000 to about 300,000.

Suitable waxes for this invention also include waxes obtained from natural sources, such as aniaml, vegetable or insect sources. Suitable waxes include beeswax, carnuba wax, montan wax, wool wax, and the like.

Another type of wax suitable for use in this invention includes the well-known Fischer-Tropsch waxes. Fischer-Tropsch waxes are waxes sythesized by the familiar Fischer-Tropsch process. By this process, coal is burned in the presence of oxygen and steam to produce hydrogen and carbon monoxide, which are then reacted in the presence of catalyst to make the desired hydrocarbon wax. Suitable Fischer-Tropsch waxes for this invention can be obtained under the trade name PARAFLINT. These particular Fischer-Tropsch waxes have a high molecular weight, on the average in the range of about 750 to 1000, and generally consist essentially of straight-chain hydrocarbons.

A further type of wax suitable for this invention comprises the solid polyethers having a molecular weight in excess of about 1000. Suitable polyethers include polyethylene glycol, polypropylene glycol, polybutylene glycol and the like. Furthermore, one or both of the terminal hydroxy groups may be replaced by an alkoxy group (capped) such as methoxy, ethoxy, and the like. Polyether copolymers are also contemplated, for example a copolymer of ethylene glycol and propylene glycol. These compolymers may have a random or block structure, or mixtures thereof. The higher-molecular-weight polyethers are preferred, especially those of 4000 or more molecular weight. Such compounds are commercially available.

Although the above waxes have been mentioned individually, suitable waxes for this invention include mixtures of various proportions of the above-mentioned waxes.

The Fluxing Agent

The fluxing agents useful in the present invention may be represented by the following formula:

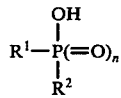

wherein $R^1$ and $R^2$ are hydrogen, hydroxyl, hydrocarbyl of 3 to 30 carbon atoms, or hydrocarbyloxy of 3 to 30 carbon atoms, provided the total number of carbon atoms contained in the $R^1$ and $R^2$ groups is from 8 to 30 carbon atoms, and further provided that at least one of the R group represents a wax-solubilizing group, and n equals 0 to 1. Preferably n is 1. Preferably the wax-solubilizing group is an alkyl group containing 3 to 20 carbon atoms, such as propyl, butyl, isobutyl, t-butyl, pentyl, hexyl, octyl, decyl, dodecyl, tetrapropenyl, hexadecyl, eicosyl, docosyl, and the like.

"Hydrocarbyl" as used herein is a monovalent organic radical composed essentially of hydrogen and carbon, and may be aliphatic, aromatic or alicyclic, or a combination thereof, and may be saturated or unsaturated. Typical hydrocarbyl groups are: octyl, octadecyl, pentacosyl, tricontyl, propylphenyl, dodecylphenyl, pentadecylphenyl, tetracosylphenyl and tricosylbenzyl.

"Hydrocarbyloxy" as used herein is a hydrocarbyl group attached to an oxygen atom by a single bond. Typical hydrocarbyloxy groups are: octyloxy, octadecyloxy, pentacosyloxy, tricontyloxy, propylphenoxy, dodecylphenoxy, pentadecylphenoxy, tetracosylphenoxy, and tricosylbenzyloxy. The preferred hydrocarbyl groups are the saturated aliphatic straight-chain hydrocarbons, preferably containing from 4 to 24 carbon atoms and more preferably 9 to 13 carbon atoms. The fluxing agents may more generally be described as comprising the alkyl and alkaryl phosphoric acid and phosphoric or phosphonic acid esters and the alkyl and alkaryl phosphinic acids, or the alkyl or alkaryl phosphorous acid and the phosphorous or phosphonous acid esters and the alkyl and alkaryl phosphinous acids.

Representative fluxing agents useful in the present invention are:
Dioctyl hydrogen phosphate
Didodecyl hydrogen phosphate
Dipentadecyl hydrogen phosphate
Octacosyl hydrogen phosphate
Tridecyl pentadecyl hydrogen phosphate
Eicosyl nonyldecyl hydrogen phosphate
Tetradecyl dihydrogen phosphate
Pentacosyl dihydrogen phosphate
Heptadecyl propyl hydrogen phosphate
Methyldodecyl hydrogen phosphate
Ethyl decyl hydrogen phosphate
Isopropyl eicosyl hydrogen phosphate
2-octaphenyl dihydrogen phosphate
4-dodecylphenyl dihydrogen phosphate
2,4-dibutylphenyl dihydrogen phosphate
4-tetradecylbenzyl dihydrogen phosphate
di(4-pentaphenyl) hydrogen phosphate
Ethylbenzene phosphonic acid
Methyl hydrogen ethylbenzene phosphonate
Tetradecyl hydrogen ethane phosphonate
Octadecyl hydrogen phosphonate
Eicosyl hydrogen phosphonate
Heptadecane phosphonic acid
4-dodecylphenyl hydrogen methane phosphonate
Octadecylphosphinic acid
Docosyl phosphinic acid
Octyl phosphinic acid
Dodecylphenyl phosphinic acid
Didecyl hydrogen phosphite
Dodecylphenyl dihydrogen phosphite
Octyl benzyl hydrogen phosphite
Octadecyl dihydrogen phosphite
Hexacosyl dihydrogen phosphite
Nonyl tridecyl hydrogen phosphite
Butyl eicosyl hydrogen phosphite
Heptadecyl hydrogen phosphonite
Triacontyl hydrogen phosponite
Docosyl hydrogen phosphonite
Dodecyl hydrogen propanephosphonite
Octyl hydrogen dodecanephosphonite
Tridecylphenyl hydrogen phosphonite
Tetradecyl hydrogen benzenephosphonite
Octadecane phosphinous acid
Undecylbenzene phosphinous acid

THE WAX-FLUX COMPOSITIONS

The wax-flux compositions of this invention are prepared by melting the wax or wax blend and dissolving the fluxing agent therein. The mixture is then stirred until homogeneity is obtained. The wax-flux composition is cast into blocks or slabs and allowed to solidify unless it is to be immediately used.

The wax-flux compositions of this invention will contain an amount effective to cause fluxing, at or below the soldering temperature of the piece to be soldered, of the above-described wax-soluble acid or ester. This effective amount can readily be determined by those skilled in the art by a few simple soldering tests to determine the minimum amount necessary. Any amount above the minimum necessary to cause effective fluxing is generally not necessary and increases the cost of the wax-flux composition without additional benefits during the soldering process. Typically, the wax-flux compositions will contain from about 1 to about 50 weight percent of the fluxing agent, more usually from about 3 to about 30 weight percent, and preferably from about 5 to about 25 weight percent.

The fluxing compositions of the present invention can be utilized in any soldering process requiring a fluxing agent. The fluxing compositions of the present invention are particularly useful in high-temperature soldering processes wherein prior art wax fluxes would normally present a fire hazard. Such high-temperature soldering processes typically require soldering temperatures of 245° to 375° C, usually 300° to 375° C.

EXAMPLES

The suitability of the wax-flux compositions of the present invention is illustrated by the following examples. The solderability tests were done using a General Electric meniscograph, which provides a continuous record of the wetting process by measuring the push-and-pull on a specimen as it is partially immersed in molten solder. When a test specimen first enters a solder bath, before wetting occurs, the specimen floats on the solder and resists being pushed into the bath. After wetting occurs, the solder climbs the surface of the specimen, pulling the specimen toward the solder. The push-and-pull on the specimen is measured by a transducer, which produces a directcurrent signal that is recorded. The total time of the test is limited to 8 seconds. With the output initially set at zero, the time required to return to zero after being partially immersed is defined as the "wetting time". Generally, the shorter the wetting time, the better the flux composition. Wetting times of about 2.5 seconds show some fluxing effectiveness, but very good fluxing agents give wetting times of less than 1.5 seconds.

Table I shows the wetting times of representative organic phosphorus-containing acids of this invention, as measured by the meniscograph.

TABLE I

| Ex. No. | Phosphorous acid fluxing agent, wt.% | Wax[1] Melting point °C | Time to wet (sec.) |
|---|---|---|---|
| 1 | Tridecyl dihydrogen phospate, 100 | — | 0.72 |
| 2 | Tridecyl dihydrogen phosphate, 10 | 68–69 | 0.85 |
| 3 | Bis(2-ethylhexyl) hydrogen phosphite, 100 | — | 0.8 |
| 4 | Bis(2-ethylhexyl) hydrogen phosphite, 10 | 68–69 | 0.96 |
| 5 | Di(dodecylphenyl)[2] hydrogen phosphate, 100 | — | 0.5 |
| 6 | Di(dodecylphenyl)[2] hydrogen phosphate, 10 | 68–69 | 0.5 |
| 7 | Di(dodecylphenyl) hydrogen phosphate, 7.5 | 68–69 | 0.83 |
| 8 | Di(dodecylphenyl) hydrogen phosphate, 5 | 68–69 | 1.0 |
| 9 | Ethyl hydrogen alkane[3] phosphate, 100 | — | 1.52 |
| 10 | Alkane[3] phospnonic acid, 100 | — | 4.6 |
| 11 | Dioctyl phosphite, 100 | — | 0.85 |
| 12 | Dioctyl phosphite, 10 | 68–69 | 1.63 |

[1]Refined petroleum wax
[2]The dodecyl group is a propylene tetramer
[3]Alkane is a mixture of $C_{18}$ through $C_{20}$ alkanes obtained from the thermal cracking of a wax In addition to the above-listed compounds, the following phosphorus-containing compounds were also tested:

| Compound | Time to wet (sec.) |
|---|---|
| Di(ethylhexyl) chloromethyl phosphonate | 8+ |
| Tris(2,3-dibromopropyl) phosphate | 8+ |
| Triisooctyl phosphite | 3.35 |
| Mixed 2-ethylhexyl octylphenyl phosphite | 8+ |
| O,O,O-triisooctyl phosphorothioate | 8+ |
| Diphenyl decyl phosphite | 8+ |

Flammability tests were carried out by dropping droplets of molten test samples from a medicine dropper on a hot plate heated to 471° C. The times to autoignition were measured. The results were as follows:

| Composition | 5 Individual droplets, Time to ignite, seconds | | | | |
|---|---|---|---|---|---|
| 1. Petroleum wax, m.p. 68–69° C | 2.2, | 1.6, | 2.5, | no. ig., | no ig. |
| 2. Same, 90 wt.%, + dodecylbenzene sulfonic acid, 10 wt.% | 0.6, | 0.9, | 1.0, | 1.0, | no ig. |
| 3. Same, 80 wt.%, + tridecyl hydrogen phosphate, 20 wt.% | No ignition — all tests | | | | |

What is claimed is:

1. A wax-flux composition comprising:
 (a) a major amount of a wax having a melting point between 40° and 100° C; and
 (b) an amount effective to cause fluxing at or below the soldering temperature of the piece to be soldered of a waxsoluble phosphorus-containing acid of the formula

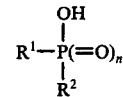

wherein $R^1$ and $R^2$ are hydrogen, hydroxyl, hydrocarbyl or hydrocarbyloxy and wherein the total number of carbon atoms contained in said $R^1$ and $R^2$ groups is from 8 to 30 carbon atoms, and n is 0 or 1.

2. A wax-flux composition of claim 1 wherein said hydrocarbyl and hydrocarbyloxy groups contain from 4 to 24 carbon atoms.

3. A wax-flux composition of claim 1 wherein said wax has a melting point of from 50° to 80° C.

4. A wax-flux composition of claim 1 wherein n is 1 and $R^1$ is hydroxyl.

5. A wax-flux composition of claim 4 wherein $R^2$ is tridecyloxy.

6. A wax-flux composition of claim 4 wherein $R^2$ is dodecylphenoxy.

7. A wax-flux composition of claim 1 wherein n is 0.

8. A wax-flux composition of claim 7 wherein $R^1$ and $R^2$ are octyloxxy.

9. A wax-flux composition comprising:
 (a) a major amount of a wax having a melting point between 40° and 100° C; and
 (b) an amount effective to cause fluxing at or below the soldering temperature of the piece to be soldered or tridecyl hydrogen phosphate.

10. The composition of claim 9 wherein said tridecyl hydrogen phosphate comprises 5 to 25 weight percent of said composition.

* * * * *